United States Patent
Emrich et al.

(10) Patent No.: US 10,751,919 B2
(45) Date of Patent: Aug. 25, 2020

(54) PLASTIC MOLDED PART AND METHOD FOR PRODUCING THE SAME

(71) Applicant: Elkamet Kunststofftechnik GmbH, Biedenkopf (DE)

(72) Inventors: Marco Emrich, Ulrichstein (DE); Martin Deussen, Marburg (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 520 days.

(21) Appl. No.: 15/503,413

(22) PCT Filed: Jul. 29, 2015

(86) PCT No.: PCT/EP2015/067420
§ 371 (c)(1),
(2) Date: Feb. 13, 2017

(87) PCT Pub. No.: WO2016/023755
PCT Pub. Date: Feb. 18, 2016

(65) Prior Publication Data
US 2017/0239853 A1    Aug. 24, 2017

(30) Foreign Application Priority Data
Aug. 15, 2014   (DE) .................. 10 2014 111 685

(51) Int. Cl.
*B29C 41/04*    (2006.01)
*B29C 41/00*    (2006.01)
(Continued)

(52) U.S. Cl.
CPC .............. *B29C 41/04* (2013.01); *B29C 33/16* (2013.01); *B29C 33/32* (2013.01); *B29C 41/003* (2013.01);
(Continued)

(58) Field of Classification Search
CPC ..... B29C 41/04; B29C 41/042; B29C 41/045; B29C 41/047; B29C 41/06; B29C 41/20;
(Continued)

(56) References Cited

U.S. PATENT DOCUMENTS 3,417,097 A   12/1968   Downing et al.
3,619,866 A   11/1971   Hofmann et al.
(Continued)

FOREIGN PATENT DOCUMENTS

DE    7113887 U       2/1972
DE    2438373 A1 *    2/1976  ............. B29C 33/16
(Continued)

OTHER PUBLICATIONS

Electric field, https://en.wikipedia.org/wiki/Electric_field, Revised Jan. 3, 2020, Accessed Jan. 5, 2020. (Year: 2020).*
(Continued)

*Primary Examiner* — Atul P. Khare
(74) *Attorney, Agent, or Firm* — Leydig, Voit & Mayer, Ltd.

(57) ABSTRACT

A method for production of a molded part made of plastic by rotational molding includes placing a starting material in a form of at least one of a plastic or a plastic precursor into a rotational melt mold that is fitted with at least one magnetic element. The rotational melt mold is rotated and, while the rotational melt mold is rotating, the starting material is shaped. The at least one magnetic element rotates together with the rotational melt mold while the starting material is being shaped. The starting material and the at least one magnetic element are configured in such a way that the starting material and the at least one magnetic element interact magnetically such that a portion of the starting
(Continued)

material is attracted and held in place by the at least one magnetic element while the starting material is being shaped.

20 Claims, 10 Drawing Sheets

(51) Int. Cl.
*B29C 33/32* (2006.01)
*B29C 33/16* (2006.01)
*B29C 41/20* (2006.01)
*B29L 31/00* (2006.01)
*B29C 45/00* (2006.01)
*B29K 105/20* (2006.01)
*B29K 105/00* (2006.01)

(52) U.S. Cl.
CPC .......... *B29C 41/20* (2013.01); *B29C 45/0013* (2013.01); *B29K 2105/0067* (2013.01); *B29K 2105/203* (2013.01); *B29K 2995/0008* (2013.01); *B29L 2031/712* (2013.01)

(58) Field of Classification Search
CPC ..... B29C 33/16; B29C 33/32; B29C 45/0013; B29C 2045/0015; B29C 2049/2445; B29C 2049/2468; B29K 2995/0008; B29K 2105/203; B25B 11/002
USPC .................................................. 264/427, 429
See application file for complete search history.

(56) References Cited

U.S. PATENT DOCUMENTS

| | | | | |
|---|---|---|---|---|
| 3,842,148 A | * | 10/1974 | Loubier | B29C 45/0013 264/437 |
| 3,861,955 A | * | 1/1975 | Lemelson | B23K 15/002 427/131 |
| 4,010,020 A | * | 3/1977 | Wyden | B29C 41/04 164/146 |
| 4,358,388 A | * | 11/1982 | Daniel | C08F 2/44 252/62.54 |
| 4,919,858 A | | 4/1990 | Newton et al. | |
| 6,000,922 A | * | 12/1999 | Wagner | B29C 33/308 264/427 |
| 6,030,557 A | | 2/2000 | Payne | |
| 6,368,538 B1 | * | 4/2002 | Kitterman | B29C 33/16 264/274 |
| 6,720,059 B2 | * | 4/2004 | Fujisawa | B32B 5/18 428/100 |
| 6,852,788 B2 | | 2/2005 | Stevenson et al. | |
| 7,736,568 B2 | * | 6/2010 | Chan | A63H 9/00 264/275 |
| 8,648,683 B2 | * | 2/2014 | Masiero | B29C 33/16 335/302 |
| 8,932,517 B2 | * | 1/2015 | Alakula | B22F 3/06 148/104 |
| 2005/0129901 A1 | * | 6/2005 | Swindler | B29C 41/06 428/76 |
| 2008/0044680 A1 | * | 2/2008 | Thibodeau | B29C 45/0013 428/547 |
| 2009/0302498 A1 | * | 12/2009 | Nedestam | A61F 13/42 264/263 |
| 2012/0183762 A1 | | 7/2012 | Poehlmann et al. | |
| 2013/0056672 A1 | | 3/2013 | Johnston et al. | |
| 2013/0057373 A1 | * | 3/2013 | Masiero | B29C 33/16 335/302 |
| 2016/0033303 A1 | * | 2/2016 | Harano | G01D 5/2451 324/207.25 |

FOREIGN PATENT DOCUMENTS

| | | | | |
|---|---|---|---|---|
| DE | 2438373 A1 | | 2/1976 | |
| DE | 3338015 A1 | | 4/1984 | |
| GB | 2045149 A | * | 10/1980 | .......... B28B 23/024 |
| GB | 2130138 A | * | 5/1984 | .......... B29C 41/003 |
| JP | 55084619 A | * | 6/1980 | ........ B29C 45/0013 |
| JP | 61147111 A | * | 7/1986 | ........ B29C 45/0013 |
| JP | 01171917 A | * | 7/1989 | ............ B29C 33/16 |
| JP | 01188000 A | * | 7/1989 | ........ B29C 45/0013 |
| JP | 05192964 A | * | 8/1993 | ........ B29C 45/0013 |
| JP | 08025427 A | * | 1/1996 | ........ B29C 45/0013 |
| JP | 2000351136 A | * | 12/2000 | |
| JP | 2007261100 A | * | 10/2007 | ........ B29C 45/0013 |
| WO | WO 2008021571 A2 | | 2/2008 | |
| WO | WO-2012069123 A1 | * | 5/2012 | ............ B29C 33/16 |

OTHER PUBLICATIONS

Electromagnetism, https://en.wikipedia.org/wiki/Electromagnetism, Revised Dec. 18, 2019, Accessed Jan. 5, 2020. (Year: 2019).*
"Electric field.", The Merriam-Webster.com Dictionary, Merriam-Webster Inc., https://www.merriam-webster.com/dictionary/electric% 20field. Accessed Jan. 5, 2020. (Year: 2020).*
"Magnetic.", The Merriam-Webster.com Dictionary, Merriam-Webster Inc., https://www.merriam-webster.com/dictionary/magnetic. Accessed Jan. 5, 2020. (Year: 2020).*

* cited by examiner

PLASTIC MOLDED PART AND METHOD FOR PRODUCING THE SAME

CROSS-REFERENCE TO PRIOR APPLICATIONS

This application is a U.S. National Stage Application under 35 U.S.C. § 371 of International Application No. PCT/EP2015/067420 filed on Jul. 29, 2015, and claims benefit to German Patent Application No. DE 10 2014 111 685.2 filed on Aug. 15, 2014. The International Application was published in German on Feb. 18, 2016 as WO 2016/023755 A1 under PCT Article 21(2).

FIELD

The invention relates to a method for the production of a molded part, especially a container, made of plastic by means of rotational molding, whereby a starting material in the form of a plastic or a plastic precursor is placed into a rotational melt mold and, while the rotational melt mold is rotating, it is shaped, whereby the rotational melt mold is fitted with at least one magnetic element.

BACKGROUND

Plastic molded parts are used in many sectors. As hollow bodies, they are used, for instance, in automotive engineering as fuel tanks or as reservoirs for other liquids. Since plastic containers are relatively easy to shape, light in weight and also corrosion resistant, plastic containers are a preferred means for storing liquids. They are expected to be mechanically stable, have a low weight and meet the increasingly strict requirements relating to efficient packaging in automotive construction.

Normally, the plastic containers are made by means of rotational molding using a rotational mold. In a familiar production method, a weighed quantity of plastic material in the form of powder, pellets, micropellets or the like is placed as the starting material into a hollow mold whose inner surface will define the outer surface of the plastic container. The mold is then made to rotate around two axes that are usually arranged perpendicular to each other. Heat is introduced into the rotational melt mold. The rotational speeds of the rotational melt molds are so slow that centrifugal forces have very little effect as compared to the force of gravity. The plastic material begins to melt and to adhere to the inside of the rotational melt mold, thereby imparting the plastic container with its later shape. This very widespread variant of the rotational molding process makes use of thermoplastics such as polyethylene (PE), polypropylene (PP), polyamide 6 (PA6), polyamide 11 or 12 (PA11, PA12), polycarbonate (PC) or the like. The processing temperatures have to be above the melting or softening temperature of the plastic material in question.

Some plastics, especially thermoplastics having very high melting or softening temperatures, for example, PA6, or else thermoset plastics, which are by nature not conducive for thermoplastic processing, are preferably processed by the rotational molding process in a likewise known manner in such a way that, as the starting material, a chemical precursor of the material provided for the molded part, the so-called plastic precursor, is placed into the rotational melt mold as a melt in liquid form, where, under rotation while simultaneously being shaped or formed, the melt reacts chemically, especially polymerizes, to form the final plastic material. This method is advantageously used, for example, for the production of molded parts made of polyamide 6 (PA6), polyamide 12 (PA12) or their copolymers, whereby the corresponding lactams, in other words, for instance, caprolactam and/or laurolactam, are used as plastic precursors that are present in solid form at room temperature under normal conditions, but that are processed by means of the rotational molding process in the form of a melt having a very low viscosity (order of magnitude of 10 mPa·s, that is to say, approximately the same as that of water). This variant of the method allows the production of plastic molded parts while avoiding the high temperatures required for thermoplastic processing, and the process temperature is preferably kept below the melting temperature of the finished plastic.

The rotational molding process also makes use of the polymerization reactions of dicyclopentadiene (DCPD) to form poly-dicyclopentadiene (PDCPD, e.g. TELENE made by Rimtec Corp.) or of cyclic butylene terephthalate (e.g. CBT made by the Cyclics company) to form polybutylene terephthalate (PBT). Moreover, it is a known procedure to use the rotational molding process to manufacture molded parts out of polyurethanes (PU) by reacting diisocyanates and/or polyisocyanates with diols and/or polyols as the plastic precursors.

The just-mentioned material systems have in common the fact that the produced molded part is made of a plastic material that is only formed during the forming process, also called the shaping, in the rotational mold, from a starting material in the form of a plastic precursor that is initially present in more or less liquid form in the rotational mold and that reacts chemically, especially polymerizes, during the shaping process.

Rotational molding with plastics as the starting material as well as with plastic precursors as the starting material is a generally known process and is described, for example, in the following monographs:

[1] Crawford, Roy J., *Rotational Moulding of Plastics*, Second Edition, Research Studies Press Ltd., Taunton/John Wiley & Sons Inc., New York, 1996,

[2] Nugent, Paul: *Rotational Molding: A Practical Guide*, 2001, as well as

[3] Crawford, Roy J., Throne, James L.: *Rotational Molding Technology*, Plastics Design Library, William Andrew Publishing, Norwich, N.Y., 2002.

Furthermore, the rotational molding method makes use of parts that are joined integrally to the container during the molding process. As a rule, so-called insert parts are made of metal. Screwing points needed in the rotated plastic product can be affixed on the inside of the mold, for example, as threaded insert parts. These insert parts, also called inserts, are embedded into the wall of the molded part during the shaping process, thus forming a sturdy connection with it after having cooled off. In contrast, so-called integral parts are generally made of plastic or else of fiber-reinforced plastic composites. In contrast to the insert parts, which are merely embedded into the wall of the molded part but without themselves forming part of the wall, integral parts constitute a part of the wall in the later molded part. In the simplest case, insert parts and integral parts are attached by a screw to the inner wall of the rotational melt mold before the forming process.

In actual practice, not only snap-on systems but also magnetic holders are used that hold the metallic insert parts in position in the rotational melt mold.

A fundamental problem in the production of containers is that the melt mold only defines the outer contour of the molded part, but not its inner shape. Even though a theoretical mean wall thickness can be established for the molded part during the production by suitably coordinating the added quantity of material with the size of the inner surface of the mold, it cannot be guaranteed that the container will exhibit a uniform wall thickness. The wall thickness is always subject to a certain variation. Precisely in the area of inner radii, that is to say, in the areas where the wall of the rotational mold protrudes into the interior of the mold, wall thicknesses are obtained that are, at times, actually considerably less than the mean wall thickness. The smaller this inner radius is, the more pronounced this reduction in the wall thickness will be. In contrast, material accumulates in the area of the outer radii, that is to say, for instance, on the outer edge of a plastic container, as a result of which the wall thickness in such areas is greater than the mean wall thickness. As the outer radius decreases, the magnitude of the increase in the wall thickness rises. Whereas outer radii merely lead to an increase in the wall thickness, the stability of thin-walled spots in the area of inner radii can be considerably impaired, thereby diminishing the strength and durability of the molded part.

Special challenges arise in conjunction with complex shapes such as, for example, integrally shaped lugs or the like. Particularly in constricted spaces, for example, in the area of outer walls that run in parallel at a small distance from each other, bridge formation can occur during the course of the rotational molding process, thus promoting void formation between the walls. The envisaged contour feature is then incompletely formed.

Precisely before the backdrop of increasing requirements relating to packaging in vehicles, however, it is often necessary to ideally utilize a complex and convoluted installation space in the vehicle or in a machine, thus entailing a complex container design. Therefore, it is desirable to be able to systematically influence the material distribution, even in molded parts with complicated shapes. In this context, it is advantageous if the wall thickness can be locally increased at specific places in the finished plastic container. Increasing the weighed-in quantity of the added material is a remedy with very limited benefits, since the additionally employed material essentially only leads to a further increase in the wall thickness in the area of the outer radii, while the wall thicknesses in the area of the thin spots are only negligibly improved. In the final analysis, this measure does nothing but increase the consumption of material and the weight of the part, so that, precisely in the case of containers and tanks, the available useful volume is reduced.

It is a known procedure to influence the wall thickness distribution by suitably selecting the rotational speed, the rotational speed ratio, the temperature course in the mold and by employing other measures. U.S. Pat. No. 3,417,097, for example, describes a method in which caprolactam in liquid form is placed into a rotational mold, the caprolactam adheres to the inner contour of the rotational mold while the mold is being rotated, and then polymerizes to form a molded part. In order to improve the uniformity of the wall thickness, it is proposed to divide the amount of material over at least two metering procedures and to employ a predetermined temperature profile and rotation profile. However, here it is not possible to influence the wall thickness in a systematic and localized manner.

Since in the rotational molding method—like with blow molding and in contrast to injection molding—only the outer surface of the molded part is in contact with the mold, the results that can be achieved by such optimization measures with a given geometry of the molded part are fundamentally limited. The more the geometry of the molded part diverges from being spherically shaped, the wider the distribution of the wall thickness. These effects are particularly pronounced during the processing of monomers that are placed into the rotational mold in the form of a low-viscosity melt and that are fully polymerized under rotation, but in principle, they occur in all rotational molding processes and with all material systems employed.

One possibility for locally influencing the wall thickness for rotational molding with plastic powders or pellets on the basis of a thermoplastic sintering process is disclosed in U.S. Pat. No. 6,852,788 B2. This publication describes a composition that comprises carrier and binder components as well as a plastic powder and that is applied as a molding compound into the areas of the rotational mold in which the wall thickness of the molded part is supposed to be increased, that is to say, for example, in the area of ribs and screw domes. Among other things, polyethylene having a very low density, Vaseline, paraffin and beeswax are proposed for use as the carrier and binder components. As an alternative, thermoplastics that have a low melt-flow index and that have been adapted to the base polymer of the molded part can be used.

This method, however, cannot be used when a plastic precursor in the form of a melt is placed into the rotational melt mold and the polymerization of the plastic precursor is carried out and initiated below the melting temperature of the finished plastic. Since the process temperatures are kept below the melting temperature of the finished polymer, the polymer material in powder form that was added along with the composition would not sinter with itself or with the material newly created by the polymerization. Moreover, the production of the molding compound is relatively laborious.

SUMMARY

In an embodiment, the present invention provides a method for production of a molded part made of plastic by rotational molding. A starting material in a form of at least one of a plastic or a plastic precursor is placed into a rotational melt mold that is fitted with at least one magnetic element. The rotational melt mold is rotated and, while the rotational melt mold is rotating, the starting material is shaped. The at least one magnetic element rotates together with the rotational melt mold while the starting material is being shaped. The starting material and the at least one magnetic element are configured in such a way that the starting material and the at least one magnetic element interact magnetically such that a portion of the starting material is attracted and held in place by the at least one magnetic element while the starting material is being shaped.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
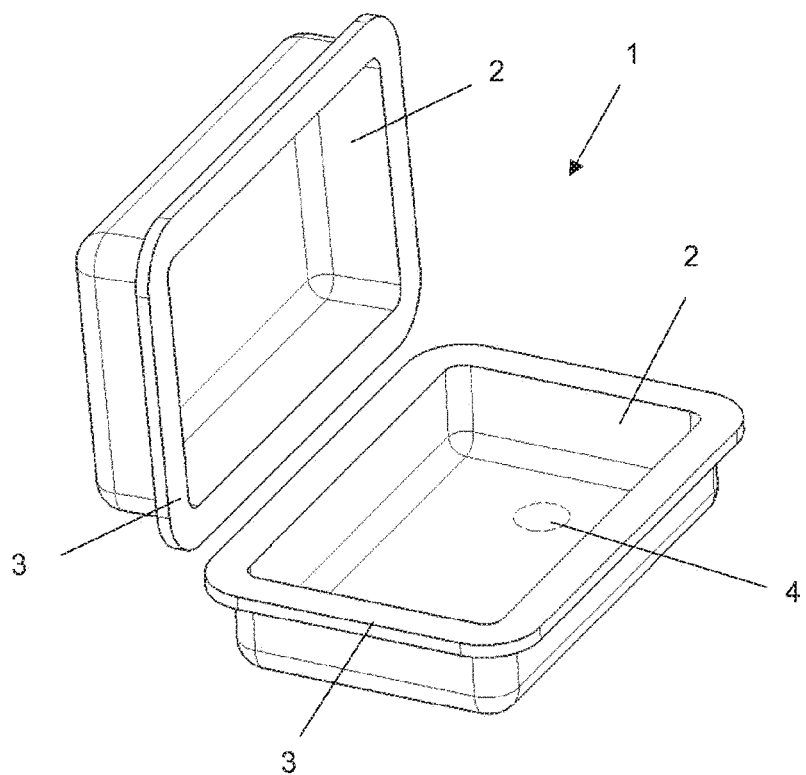
FIG. 1 a perspective view of a rotational melt mold for the production of a plastic molded part according to a first embodiment of the invention.

In an embodiment, the present invention provides an improved way to systematically influence the wall thickness of a plastic molded part made by means of the rotational molding process, so that the wall thicknesses of the finished plastic molded part can be locally increased and strengthened.

According to an embodiment of the invention, the method provides for the starting material and the magnetic element to be configured in such a way that the starting material and the magnetic element that is fitted onto the rotational melt mold interact magnetically and a portion of the starting material is attracted and held in place by the magnetic element during the shaping process.

According to an embodiment of the invention, rather than bonding the starting material at predetermined sites using fixing agents such as carrier and binder components, the starting material is imparted with magnetic properties so that the starting material can interact magnetically with the magnetic element. In other words, the starting material is configured in such a way that it can be attracted and held in place by the magnetic element. Therefore, the starting material itself can be magnetic.

Unlike carrier and binder component-based systems, the approach of holding the starting material in place is based on magnetic attraction between two bodies and, as set forth in the invention, it expresses itself, among other things, as the effect of force between magnets, magnetized or magnetizable objects, and moving electric charges. This force is exchanged via a magnetic field that, on the one hand, is generated by these objects and, on the other hand, can act upon them. In contrast to known systems for guiding the material and positioning plastic material during the forming process as is the case with a carrier and binder component-based system or with a magnetic fixation of metal parts, according to an embodiment of the invention, a plastic material is provided that has magnetic properties or that is magnetic and that interacts with the magnetic element.

As set forth in the invention, the terms "magnetic properties" or "magnetic" are to be understood to the effect that the starting material and the magnetic element are configured such that the interaction described above between these components occurs during the shaping or forming process. Therefore, the starting material and/or the magnetic element can be, for instance, magnetic, magnetized or magnetizable. According to the invention, the starting material and/or the magnetic element create a magnetic field.

The invention encompasses all possibilities with which magnetic forces can be generated between the starting material and the magnetic element, so that a portion of the starting material is held in place by the magnetic element during the rotational molding process. Therefore, the starting material and/or the magnetic element can be a magnet, while the other portion is at least magnetizable, preferably magnetic.

As set forth in the present invention, the term "magnetic" relating to the starting material can also mean that the material in question has a magnetic susceptibility $\chi>0$ or that it contains additives with a magnetic susceptibility $\chi>0$. The magnetic susceptibility indicates the magnetizability of matter in an external magnetic field. The magnetic permeability $\mu_r$ (also magnetic conductivity) determines the permeability of matter for magnetic fields. Since the magnetic susceptibility $\chi$ and the relative magnetic permeability $\mu_r$ of a substance are linked to each other by the relationship $\chi=\mu_r-1$, suitable starting materials and/or suitable additives at the same time have a relative permeability (or permeability index) $\mu_r>1$. The susceptibility can be determined experimentally, for instance, with a Gouy balance or with a Faraday balance.

The starting material here can be paramagnetic but it is preferably ferromagnetic, ferrimagnetic or superparamagnetic. The starting material does not necessarily have to be magnetized, that is to say, it does not have to have any permanent magnetic properties itself. However, if desired, this can be the case.

Ferromagnetism is the property of certain materials to contain elementary magnets that can be aligned in parallel to each other. This means that pieces of these materials either cause a static magnetic field themselves or else they are attracted by the magnetic pole of an external magnetic field. This attraction does not depend on the polarity of the external magnetic field and it is caused by the fact that the direction of the elementary magnets that are aligned in parallel is rotated in the ferromagnetic material in such a way that this direction is parallel to the external magnetic field. Examples of ferromagnets are α-iron, cobalt and nickel.

Ferrimagnetism is a cooperative magnetic phenomenon through which ferrimagnetic substances exhibit magnetization. Such substances have a crystalline structure, whereby the magnetic moments of the atoms are each aligned alternatingly antiparallel within certain domains (so-called Weiss domains) and they differ in terms of their magnitude. Material groups with ferrimagnetic properties include the ferrites.

Paramagnetism is one of the types of magnetism in matter. Paramagnets only have a magnetization that differs from zero as long as they are situated in an external magnetic field. The disordered magnetic moments of an atom or molecule become partially ordered in an external magnetic field so that the magnetic field inside the paramagnetic substance is increased, but only as long as the external magnetic field exists. Paramagnetic materials have the tendency to be drawn into a magnetic field. Examples of paramagnetic substances are aluminum, sodium, α-manganese and oxygen.

Superparamagnetism refers to the magnetic property of very small particles of a ferromagnetic or ferrimagnetic material not to retain any permanent magnetization, even at temperatures below the Curie temperature $T_C$, once a previously applied magnetic field has been switched off.

Diamagnets are magnetized in an external magnetic field so that the inside of the magnetic field weakens proportionally to the strength of the applied magnetic field, and consequently, diamagnetic materials have the tendency to migrate out of a non-homogeneous magnetic field. Lead is an example of a diamagnetic substance.

The method according to an embodiment of the invention can comprise the following steps:
a) providing a rotational melt mold that is fitted with at least one magnetic element;
b) placing the starting material into the rotational melt mold;
c) causing the rotational melt mold to rotate, whereby a portion of the starting material is held in place by the magnetic element.

The starting material can be a plastic in the form of powder, pellets, micropellets or the like, or else a plastic precursor in the form of a melt, whereby the container shape is created and the container wall is defined by the forming or shaping process. The terms "forming" and "shaping" for such a starting material refer to the process in which the starting material forms at least part of the container wall while the rotational melt mold is rotating.

While the rotational melt mold is rotating, the magnetic element attracts a portion of the starting material and holds it in place so that the starting material is concentrated locally in the area where the magnetic element is located, or else the portion of the starting material in the total quantity of the starting material is increased in the area where the magnetic element is located. In other words, the starting material collects or accumulates locally in the area where the magnetic element is located. An essential component of the shaping process is the rotation of the rotational melt mold. During step c), that is to say, while the rotational melt mold is rotating, a portion of the starting material remains at the magnetic element since this portion of the starting material is affixed or held at the place where the magnetic element is located. The term "affixed" as set forth in the invention is to be understood to the effect that the magnetic element exerts an attractive and adhesive effect on the starting material, so that a portion of the starting material does not move away from the area around the magnetic element, in spite of the rotation of the rotational melt mold.

Without the magnetic element, all of the starting material would move and be distributed differently in the interior of the rotational melt mold as a result of the rotation of the rotational melt mold, as will be explained in greater detail below. During an early phase of the process and/or at a temperature and/or consistency of the starting material at which the starting material is not yet adhering to the inner wall of the rotational melt mold, the starting material in the method according to the state of the art flows or trickles down as a result of the force of gravity, namely, from the mold wall in the direction of the pool of material at the lowest point of the mold when the wall moves out of the pool during the rotation. This also applies correspondingly in later phases of the method when a portion of the starting material is already adhering to the inner wall of the rotational melt mold and rotates together with the mold, whereas, at the same time, another portion of the starting material is still present as a pool of material that moves in the mold essentially independently of said mold. The buildup of the wall thickness at a given place in the mold depends essentially on how often this place passes through the pool of material and on how well—that is to say, with which layer thickness—the starting material that is present in the pool adheres to this place on the mold shell and is held and carried along by the mold shell during each of these passages.

In contrast to this, in the method according to an embodiment of the invention, a portion of the starting material is held in place on the mold wall in the area of the magnetic element and does not flow or trickle down from the mold wall. The fixation to the mold wall is due to magnetic interaction and is not dependent on the temperature and/or consistency of the starting material at this point in time. The magnetic fixation occurs especially already when the area of the rotational melt mold that is fitted with the magnetic element passes for the first time through the pool of material. During the further course of the process, the starting material that is held in place on the mold wall in the area of the magnetic element is sintered and consolidated at this place (starting material in the form of a plastic) or polymerized (starting material in the form of a plastic precursor). The same effect persists accordingly in later phases of the process as well, when a portion of the starting material is already adhering to the inner wall of the rotational melt mold and rotating together with it, while, at the same time, another portion of the starting material is still present in the form of a pool of material that is moving inside the mold essentially independently of the latter.

In this manner, the thickening of the wall of the molded part is systematically promoted in the area of the rotational melt mold that is fitted with the magnetic element, so that the molded part produced by the method according to an embodiment of the invention has a greater wall thickness in this area.

The term "increase in the wall thickness" means that the wall thickness in the appertaining area of the molded part is greater than the wall thickness that can be achieved there by a method according to the state of the art, that is to say, without magnetic fixation. Therefore, the wall thickness of the appertaining area increases relative to the mean wall thickness of the molded part. This does not necessarily mean that the wall thickness in the appertaining area is absolutely greater than the mean wall thickness. It can mean, for instance, that, in the case of a molded part with a nominal wall thickness of 5 mm that is produced by means of the method according to the state of the art, a given area has a wall thickness of only 1 mm, but this would amount to 3 mm when produced according to an embodiment of the invention. Of course, it is also possible to achieve local increases in the wall thickness in which the wall thickness in the area of the magnetic element is greater than the nominal wall thickness.

The nominal wall thickness $d_N$ (mean wall thickness) of the plastic molded part results from the inner surface A of the rotational melt mold and from the mass m as well as from the density $\rho$ of the plastic material in the processed state, in a close approximation according to $d_N = m \cdot A^{-1} \cdot \rho^{-1}$.

The magnetic element thus serves to locally concentrate or locally accumulate and hold starting material during the rotation of the rotational melt mold. Through the use of the magnetic element, the starting material can be concentrated locally by means of magnetic interaction.

The magnetic element is part of the rotational melt mold or else it is attached to the rotational melt mold. In both cases, the magnetic element rotates together with the rotational melt mold. Thus, no relative movement between the rotational melt mold and the magnetic element occurs, but rather, the rotational melt mold and the magnetic element move as one or as a unit. Therefore, even during the rotation of the rotational melt mold, the magnetic element is always stationary relative to its position on the rotational melt mold. Owing to the magnetic interaction, the portion of the starting material in the area where the magnetic element is arranged increases, whereas said portion would be less in this area if there were no magnetic element. Accordingly, the rotational melt mold has at least one magnetic element to concentrate starting material locally during the shaping process.

Thus, the method can comprise the steps which are defined as follows:
a) providing a rotational melt mold that is fitted with at least one magnetic element;
b) placing the starting material into the rotational melt mold;
c) causing the rotational melt mold to rotate, whereby a portion of the starting material is held in place by the magnetic element while the rotational melt mold rotates during the shaping process, whereby the magnetic element rotates together with the rotational melt mold.

It has been found that, during the rotational molding, the systematic use of a magnetic element in conjunction with a magnetic starting material yields sharply delineated and stable local increases in the wall thickness in the specific areas of the rotational mold where the magnetic element is arranged. The magnetic element holds a portion of the starting material in place by means of magnetic interaction, thereby allowing the wall thickness of the plastic molded part to be systematically influenced.

Thanks to the features according to embodiments of the invention, it is possible to systematically guide the material inside the rotational melt mold, as a result of which, during the processing of starting material in the form of mixtures, one or more materials from the mixture are preferentially, or even selectively, deposited in a certain area of the rotational mold and consequently also in a certain area of the finished plastic molded part.

The solution according to an embodiment of the invention can be used universally for a number of rotational molding processes and can be employed for rotational molding processes on the basis of a thermoplastic sintering method as well as for rotational molding processes on the basis of low-viscosity plastic precursor melts that polymerize in the rotational mold.

The magnetic element is put in place and, if applicable, affixed for example, glued, screwed, clamped, shrunk, pressed or the like, into those areas of the rotational mold where the wall thickness of the finished plastic molded part is supposed to be increased or else where a certain functional or contour feature is supposed to be shaped onto the finished molded part.

However, it is also possible to configure the magnetic element as an insert part made, for instance, of metal, or as a preformed integral part made of plastic that is at least partially embedded into the wall of the molded part during the shaping process. A plastic or a plastic precursor that likewise has magnetic properties interacts magnetically with the insert part or the integral part during the shaping, so that a large quantity of the plastic collects in the area of the magnetic element. Thus, for example, a flange, a connector or the like can be very firmly attached to the container wall and embedded into the plastic.

In order to impart the plastic material with magnetic properties, there is at least one component that is embedded into the starting material and that is configured to interact magnetically with the magnetic element.

Another embodiment of the invention provides for the plastic of the starting material to have a substance added to it, for example, in the form of an additive or the like, which is configured to interact magnetically with the magnetic element. In other words, the plastic of the starting material can be provided with a magnetic additive. The magnetic additive can be provided as an alternative to or in addition to the embedded magnetic components.

The starting material can be a plastic precursor with magnetic properties and a magnetic susceptibility $\chi>0$. As an alternative or in addition, the plastic precursor can contain magnetic additives with a magnetic susceptibility $\chi>0$. The plastic precursor is placed into the mold, for example, in the form of a liquid with a low viscosity. Depending on the plastic precursor, on the formulation and on the temperature, the initial viscosity is usually within the range from 4 mPa·s to 5000 mPa·s, and in the above-mentioned lactam systems, it is preferably within the range from 4 mPa·s to 100 mPa·s. In this case, it is provided that the plastic precursor is placed into the rotational melt mold as a liquid melt. However, it can also be added in solid form (e.g. as powder, pellets, flakes or the like) and only melted once it is in the mold, so that a portion of the formed melt is held in place by the magnetic element.

When the plastic precursor is used, it is fundamentally possible to introduce heat into the rotational melt mold during step c). However, in general, it proves to be advantageous to carry out step c) at a process temperature at which the plastic precursor is present in liquid form. The magnetic element holds a portion of the plastic precursor in place when the rotational melt mold is rotating, preferably biaxially. Since the magnetic element holds the melt at a clearly defined position, the buildup of wall thickness in the area that is fitted with the magnetic element is promoted since the magnetic interaction between the starting material and the magnetic element causes this area to undergo a greater material accumulation than in other areas of the mold.

Heating up the rotational melt mold during the process is not absolutely necessary. Suitable material systems such as, for example, polyurethanes (PU), can also be processed at room temperature. The plastic precursor then merely has to be placed into the rotational melt mold in liquid form as a melt, where it fully polymerizes during the subsequent rotation of the melt mold.

The production of the molded part in the rotational melt mold is carried out under slight pressure at the most, typically at a pressure of less than 2000 mbar, preferably less than 1500 mbar. Very preferably, the rotational melt mold, however, is vented, so that the process takes place essentially pressure-free, that is to say, at atmospheric pressure (e.g. 1013 mbar).

The starting material can also be a plastic with magnetic properties and a magnetic susceptibility $\chi>0$. As an alternative or in addition, the plastic can contain magnetic additives with a magnetic susceptibility $\chi>0$ and can be placed into the mold in the form of particles, for example, as powder, pellets, granules or the like. The magnetic additives can be admixed with the particles of the plastic material or can be "dry blended" with them or else placed into the mold separately and mixed with the plastic material there. Preferably, the magnetic additives are thoroughly mixed with the plastic material by compounding so that the interior of the plastic particles is filled with the additives, thereby especially ensuring a tight cohesion between the plastic particles and the magnetic additives. In this case, it is also sufficient if only some of the plastic particles contain magnetic additives. The basic substance, the dyeing, the selection of additives as well as other aspects of the plastic material can be identical or different for magnetic and non-magnetic particles.

Fundamentally, the magnetic properties can be chemically integrated into the plastic material in that, for example, substituents are present on the polymer chain or monomer units are present in the polymer chain, both having a magnetic susceptibility $\chi>0$. In this case as well, mixtures of magnetic and non-magnetic plastic materials can be used, whereby the basic substance, the dyeing, the selection of additives as well as other aspects of the plastic material can be identical or different for magnetic and non-magnetic particles.

When plastic is used as the starting material, the rotational melt mold is preferably heated during the forming process in step c). Here, the magnetic element holds a portion of the starting material in place when the rotational melt mold is rotating, preferably biaxially. Since the magnetic element holds some of the particles of the plastic material in place, the buildup of wall thickness in the area that is fitted with the magnetic element is promoted since, as a result of the magnetic interaction between the starting material and the magnetic element, this area undergoes a greater material accumulation than in other areas of the mold.

In this method variant as well, the production of the molded part in the rotational melt mold takes place at most under low pressure, typically at a pressure of less than 2000 mbar, preferably less than 1500 mbar. Especially preferably, the rotational melt mold is vented so that the method takes place essentially pressure-free, that is to say, at atmospheric pressure (e.g. 1013 mbar).

Moreover, an integral part made of plastic can be provided whose plastic can interact magnetically with the starting material and/or with the magnetic element. According to an embodiment of the invention, a method for the production of a molded part, especially a container, made of plastic by means of rotational molding, is characterized in that an integral part made at least partially of plastic is placed into a rotational melt mold and, during the shaping of the molded part or while the rotational melt mold is rotating, it is incorporated integrally into the molded part, for example, into a container wall, in that the rotational melt mold is fitted with at least one magnetic element, and in that the integral part and the magnetic element are configured in such a way that the plastic of the integral part and the magnetic element interact magnetically, and the integral part is attracted and held in place by the magnetic element during the shaping of the molded part. In the later molded part, the integral part forms part of the wall of the molded part and can also fulfill special functions or have special properties. The integral part can be configured, for example, in the form of a lug, a spout, a translucent viewing window or the like, and consequently, it can form an integrated lug, spout, translucent viewing window or the like in the molded part. Here, the integral part is exposed towards the outside as well as largely exposed towards the inside, without being covered by a plastic layer formed by the starting material. It can be visible from both sides of the wall of the molded part, and it forms a part of the outer wall of the molded part and preferably also of the inner wall of the molded part.

The portion of the integral part that is largely exposed towards the outside can amount to over 50% of its surface area facing the outside of the molded part. Preferably, it is over 75%, especially preferably over 90%. The portion of the integral part that is largely exposed towards the inside can amount to over 50% of its surface area facing the inside of the molded part. Preferably, it is over 75%, especially preferably over 90%. The term "outside" always refers to the side of the molded part that faces the mold shell during the shaping process.

Thus, the integral part can be held in position by the magnetic element during the shaping process. Another effect consists of the fact that a portion of the starting material is attracted by the integral part and held in place during the shaping process.

The integral part can be used in combination with the starting material in the form of plastic or plastic precursors. The plastic of the starting material or of the plastic that is formed with the plastic precursor can be identical to or different from the plastic of the integral part. The integral part made of plastic can be made, at least partially, of a plastic with magnetic properties and a magnetic susceptibility $\chi>0$. As an alternative or in addition, the integral part can contain magnetic additives with a magnetic susceptibility $\chi>0$.

For such an integral part, the terms "forming" or "shaping" refer to the process in which a plastic or plastic precursor is shaped and forms at least part of the container wall. During this process, the integral part is incorporated or embedded into the wall of the molded part, thereby forming another part of the container wall. The plastic or plastic precursor into which the integral part is embedded can likewise have magnetic properties.

According to an embodiment of the invention, the integral part can be positioned in the mold in the area of the magnetic element at the beginning of the process and it can be held in place there by the magnetic element. Thus, the magnetic element can assume a fixation function. Starting material, for example, a plastic or a plastic precursor, that can optionally be either magnetic or non-magnetic, is placed into the rotational melt mold, which then rotates, preferably biaxially, and is heated up if desired. Thus, certain contour areas or functional features of the later plastic molded part—for instance, lugs, spouts, internal partitions, chambers, baffles, filter bowls, areas consisting of a different material or of a differently dyed material, viewing windows or the like—can be placed into the mold as a pre-formed integral part, they can be magnetically held in place there and, during the process, they can be joined to additional starting material by means of sintering, embedding or the like, so that they are integrated into the plastic molded part or into its wall, thus themselves forming a part of the wall of the molded part.

The magnetic integral part can also impart special properties to the plastic molded part in that it is made, for instance, of filled or fiber-reinforced materials or of materials containing special additives. Thus, for the local reinforcement of the plastic molded part, it is advantageous to provide integral parts made of fiber-reinforced plastic composites (FRP materials) or made of their corresponding precursors containing magnetic additives. Specially stressed places in the molded part can be systematically reinforced in this manner.

Moreover, the fiber-reinforced plastic composite can contain a thermoplastic or a thermoset plastic as the matrix. The integral part containing fibers can especially be a prepreg, a preform, a continuous fiber-reinforced thermoplastic sheet material or the like, which have a magnetic susceptibility $\chi>0$ or magnetic additives with a magnetic susceptibility $\chi>0$, and that is preferably adapted to the mold contour and to the later contour of the molded part. It is placed into the mold in the area of the magnetic element, held in place there magnetically and joined to additional starting material during the process by means of impregnation, polymerization, sintering, embedding or the like, and thereby integrated into the plastic molded part or into its wall. A prepreg is a woven fabric, a nonwoven fabric or the like that has been impregnated with a curable resin and that is cured by means of a thermal treatment, a process in which a thermoset plastic matrix is created. A preform is a woven fabric, a nonwoven fabric or the like that is held in its later shape by adhesives or fixing agents and that does not yet contain a plastic matrix or that has not yet been impregnated with curable resin. An organic sheet is a fiber composite into which a woven fabric, a nonwoven fabric or the like has been embedded into a thermoplastic matrix.

The integral part, however, can also have any other desired properties. Thus, for example, a plastic molded part can be made of a first plastic material with an integral part that is made of a second plastic material, as a result of which the molded part acquires certain desired properties locally.

When it comes to production processes in which the starting material is placed into the rotational melt mold as a plastic precursor in liquid form, the starting material is preferably a low-viscosity melt, especially an oligomer or monomer melt. Depending on the plastic precursor, on the formulation and on the temperature, the initial viscosity is usually within the range from 4 mPa·s to 5000 mPa·s. Thus, for the production of plastic molded parts made of polyamide 6 (PA6), polyamide 12 (PA12) and their copolymers as the monomer starting material, it is preferable to use the corresponding lactams such as, for example, caprolactam and/or laurolactam as the plastic precursors. Depending on the formulation and on the temperature, the lactam melts have an initial viscosity within the range from 4 mPa·s to 100 mPa·s.

Other suitable materials for the production of the molded parts according to embodiments of the invention are polydicyclopentadiene (DCPD) and polybutylene terephthalate (PBT). As the monomer or oligomer starting material, in these cases, it is preferable to use dicyclopentadiene (DCPD; e.g. TELENE made by Rimtec Corp.) or cyclic oligobutylene terephthalate (e.g. CBT made by the Cyclics company), along with the appropriate catalysts or additives. Other options include polyurethanes (PU) for whose production mixtures of diioscyanates and/or polyisocyanates and diols and/or polyols are used as the plastic precursors. One or both of these precursor components can also be oligomers or prepolymers, that is to say, polymers with a relatively low molecular weight.

Plastic precursors as set forth in the present invention are generally monomers, oligomers, prepolymers and the like, including mixtures of two or more substances of these categories. The plastic precursors according to the invention are present in the rotational melt mold in the form of liquid melts and they react by forming a plastic, if applicable, under the influence of catalysts, activators or other additives that have likewise been added. The reaction can be radical, cationic or anionic polymerization, polyaddition, polycondensation, metathesis polymerization or the like. The plastic obtained can be a thermoplastic or a thermoset plastic.

In general terms, plastics as set forth in the present invention are polymers that can be sintered or thermoplastically processed such as, for example, polyethylene (PE), polypropylene (PP), polyamide 6 (PA6), polyamide 11 (PA11), polyamide 12 (PA12), polycarbonate (PC), polyvinylchloride (PVC) and the like. These also include material types that are chemically crosslinked in the rotational melt mold by crosslinking agents that have been added to the thermoplastic starting material and that consequently yield a plastic molded part made of thermoset material, for instance, crosslinked polyethylene (XPE) in the case of the processing of polyethylene (PE) that has been made crosslinkable by the addition of appropriate additives.

The starting material or the magnetic additives to the starting material have a magnetic susceptibility $\chi>0$ or, to put it in other words, a relative permeability $\mu_r>1$. Consequently, they have paramagnetic, ferrimagnetic, ferromagnetic or superparamagnetic properties. Starting materials or magnetic additives with ferrimagnetic, ferromagnetic or superparamagnetic properties are preferred due to the magnitude of the magnetic interaction with the magnetic element.

The magnetic starting material or the magnetic additives can be used in the magnetized state, that is to say, in the form of (if applicable, microscopic) permanent magnets. If the magnetization is too strong, however, unwanted agglomeration can occur. Therefore, the magnetic starting material or the magnetic additives are preferably used without a preceding magnetization. If the starting material and/or the magnetic additives are pre-magnetized, that is to say, if they are used as microscopic permanent magnets, then the magnetic element itself does not necessarily have to be magnetized, but in this case, it can also be a permanent magnet or an electromagnet.

Generally speaking, paramagnetic metal salts or paramagnetic metal complexes are options as magnetic additives. The larger the number of unpaired electrons of the central atom or central cation, the greater the magnitude of the paramagnetism. Therefore, in the case of complexes, preference is given to those whose organic or inorganic ligands bring about slight ligand field splitting as set forth in ligand field theory, so that the metal of the central atom or central ion is present in a high-spin configuration. In general, the strength of the magnetic interaction between the magnetic element and the paramagnetic starting material, however, is relatively low. However, markedly stronger interaction forces between the magnetic element and the magnetic starting material or its magnetic additives can be achieved if cooperative or collective magnetic effects are utilized which occur in magnetic solids below the appertaining Curie temperature $T_C$ and which lead to very high values in the susceptibility $\chi$ or in the permeability $\mu_r$.

Therefore, as the magnetic additives, it is preferable to use metallic, ceramic, composite or other materials that have appropriate magnetic properties in which the magnetically active component is present as a solid (if applicable, nanoscale), that is to say, in the form of shavings, filings, powders, other particles or nanoparticles. Suitable options are ferromagnetic metals such as, for example, iron (Fe), cobalt (Co), nickel (Ni) or ferromagnetic alloys such as, for instance, of iron, aluminum, nickel and cobalt ("Alnico") or those from samarium, iron and cobalt. Heusler alloys from copper, aluminum and manganese, all metals that are not in and of themselves ferromagnetic, are likewise suitable as ferromagnetic additives, and so are alloys from neodymium (Ne), iron (Fe) and boron (B).

Magnetite ($FeO.Fe_2O_3=Fe_3O_4$) has ferrimagnetic properties and is likewise suitable as an additive that has a high magnetic susceptibility. Other ferrites of the general type $M^{II}O.Fe_2O_3$ are ferrimagnetic, too, they have high magnetic susceptibilities and are thus suitable as magnetic additives, whereby $M^{II}$ can be, for instance, manganese (Mn), cobalt (Co), nickel (Ni), copper (Cu), zinc (Zn), magnesium (Mg) or cadmium (Cd).

Ferromagnetic or ferrimagnetic materials in the form of nanoparticles can also be used as magnetic additives. If the particle size is selected in such a way that each particle consists of only one magnetic domain (Weiss domain), the additives then exhibit superparamagnetic behavior.

The size and optionally the surface treatment or surface coating of the particles that are used as magnetic additives can be harmonized with the specific starting material.

In the case of low-viscosity plastic precursor melts, it has been found that the magnetic particles should not be too large, since otherwise, in a manner of speaking, a sedimentation of the magnetic particles in the field gradient occurs in the non-homogenous magnetic field of the magnetic element, because the particles and the surrounding melt can move essentially independently of each other. Then the magnetic element on the mold—in the worst-case scenario—is occupied primarily by magnetic particles without this being accompanied by an appreciable guiding of the material or by an increase in the wall thickness. The outer surface of the wall of the plastic molded part has an accumulation of the magnetic additive in the area of the magnetic element.

This undesirable effect can be reduced, thereby giving rise to a more desirable result if sufficiently small particles are selected for the magnetic additive. Good results can be obtained with particle sizes smaller than 50 µm, especially preferably smaller than 10 µm, very preferably in the form of nanoparticles smaller than 500 nm, even more preferably smaller than 100 nm, particularly preferably smaller than 20 nm. As the particle size decreases, the particle size moves into the order of magnitude of the magnetic domains (Weiss domains). If the particle size corresponds to the size of a magnetic domain, particles made of actually ferromagnetic or ferrimagnetic substances exhibit superparamagnetic behavior.

The influence of sedimentation effects or de-mixing in a non-homogenous magnetic field during the processing of low-viscosity plastic precursor melts diminishes, not only when the particle size decreases but also when the initial viscosity of the melt increases, and consequently, as an alternative or in addition, it can be reduced by adding viscosity-raising additives to the plastic precursor.

As an alternative or in addition, sedimentation effects can be effectively reduced in that the magnetic element is not configured as a permanent magnet but rather as an electromagnet. In this manner, the magnetic field can then be systematically switched on when the reaction of the initially very low-viscosity melt of the plastic precursor has begun and has already led to an increase in the viscosity. The point in time for switching on the magnetic field is preferably selected in such a way that, on the one hand, the material viscosity is high enough to largely eliminate sedimentation effects but, on the other hand, still low enough to permit the desired effect of guiding the material in the tool. This can be empirically determined ahead of time by conducting preliminary experiments for any combination of the material system, the magnetic additives and the rotational mold.

Additional possibilities for reducing de-mixing as well as for preventing agglomeration arise from a surface treatment or surface coating of the magnetic particles. Thus, the particles of the magnetic additives can be coated and isolated from each other through encapsulation with surface-active substances such as surfactants (e.g. tetraalkyl ammonium ions), fatty acids or polymers. At the same time, this improves their compatibility with the starting material. As a result, the stability of the suspension, dispersion or colloidal solution is increased, so that sedimentation or agglomeration of the particles is effectively reduced. The individual particles—similar to molecularly dispersed substances dissolved in solvents—acquire a "solvate sheath" of molecules of the plastic precursor melt so to speak, through the involvement of the surface-active coating.

If the added magnetic particles are small enough, they are already held in suspension in the precursor melt by their thermal energy. According to $d < (6\, kT/\pi \Delta \rho g\, h)^{1/3}$, the particle size d needed for this depends on the height h of the fluid volume, on the temperature T and on the density differential $\Delta\rho$ between the particles and the plastic precursor melt; k is the Boltzmann constant, and g is the acceleration of gravity. If h=10 cm, T=293 K and $\Delta\rho$=4000 kg/m$^3$, the result is that particles with a diameter of 12 nm and less can be kept in suspension by the thermal energy. Completely independently of these sedimentation considerations in the gravitational field, this concurrently corresponds approximately to the size range in which particles consist of ferromagnetic or ferrimagnetic materials from one domain (Weiss domain) and thus have superparamagnetic properties. For this reason, special preference is given to nanoparticles with diameters of less than 20 nm as the magnetic additives added especially to low-viscosity plastic precursor melts.

Magnetic nanoparticles of the type described are commercially available. They are used, for example, in the form of ferro-fluids that are employed in the technical realm, for instance, in low-friction gaskets for rotating shafts or in order to cool loudspeakers.

If the covering of the magnetic nanoparticles consists at least partially of polymerizable molecules that can be polymerized together with the plastic precursor, then the magnetic nanoparticles are chemically linked via their covering to the plastic material of the molded part that is being formed.

The magnetic interaction between a starting material and a magnetic element can also be employed so that one of several materials of a material mixture is preferentially, or even selectively, deposited in an area of the mold that is fitted with a magnetic element in that, during the processing of material mixtures, only one of the starting materials present in the mixture is magnetic or contains magnetic additives.

According to another embodiment, the starting material is part of a mixture, whereby at least another part of the mixture is non-magnetic. Thus, for example, a starting material can be used that comprises a mixture of magnetic and non-magnetic materials. It has been ascertained that, owing to the systematic use of a magnetic element in conjunction with a mixture of magnetic and non-magnetic starting materials, the magnetic material is preferentially, or even selectively, deposited in the specific areas of the rotational mold where the magnetic element is located. The magnetic element holds the magnetic portion of the starting material in place by means of magnetic interaction, thereby making it possible to guide the material to certain places in the plastic molded part.

In order to produce a black container with a transparent or translucent viewing window that serves for checking the filling level, for example, a black starting material, e.g. a thermoplastic that is dyed black (for instance, PE, PP, PC, PA) can be processed in the mold together with a transparent or translucent starting material, e.g. an undyed thermoplastic (for instance, likewise PE, PP, PC, PA). The magnetic element is arranged in the area of the mold where the viewing window is supposed to be situated in the later product. For this purpose, the undyed material contains magnetic additives, whereas the material that has been dyed black does not contain any magnetic additives. The magnetic particles of the undyed starting material are preferentially, or even selectively, deposited in the area of the magnetic element, so that the black plastic molded part has a viewing window made of transparent or translucent material.

Such magnetic areas in a plastic molded part can be used for a wide array of application purposes. Aside from the production of plastic molded parts with viewing windows, it is also possible to manufacture molded parts that are multicolored or that have certain areas having other special properties.

Fundamentally, one or more magnetic elements can be used during the production of a plastic molded part and they can bring about the above-mentioned effects.

The magnetic element can be a permanent magnet that is rod-shaped, U-shaped, ring-shaped, disc-shaped or that has some other shape. However, the magnetic element can also consist of a ferromagnetic or ferrimagnetic material that is not magnetized so that the magnetic element itself is not a permanent magnet.

In this case, the starting material that is used is preferably one that is pre-magnetized and/or that contains pre-magnetized additives and thus itself has permanent magnetic properties.

An electromagnet can also be used as the magnetic element. In this case, the electromagnet in the rotational mold can be energized from the outside so that a reliable and strong magnetic field is created. In all of the above-mentioned cases, the material, the design and the magnetic properties of the magnetic element can be adapted to the application case in question.

In order to achieve the strongest and locally most sharply delineated effect possible during the magnetic fixation of the starting material, materials with a low magnetic susceptibility can be used for the rotational melt mold, especially for its mold shell, especially those materials that are diamagnetic or paramagnetic, but not ferromagnetic or ferrimagnetic, that is to say, for example, aluminum. This takes into account the influence of the material on the course of the magnetic field lines between the starting material and the magnetic element. Moreover, the design of the rotational mold can also be selected in such a way that the desired magnetic field lines are formed. The effect according to an embodiment of the invention, however, can also be observed in steel molds, especially at small thicknesses of the mold wall, or when the magnetic element is arranged in a through-hole of the mold wall and is in direct contact with the starting material, or when it is arranged from the outside in an indentation or in a blind hole in the mold wall.

Possible materials for the magnetic element include all metallic, ceramic or other materials or composites that are suitable for the production of permanent magnets or electromagnets. The material of the magnetic element has to be able to withstand the conditions of the rotational molding process. Its Curie temperature $T_C$ has to be above the process temperatures of the envisaged rotational molding process, preferably well above it.

Thus, for example, magnets made of ferrite can be used, which has a Curie temperature of approximately $T_C=450°$ C. and can be used at temperatures up to 250° C. Samarium-cobalt alloys (SmCo) are also suitable as a material for the magnetic element. Their Curie temperature is comparable to that of ferrite materials and they can be used at temperatures up to 300° C.

Suitable options for use at even higher temperatures include AlNiCo alloys having the main components of iron (Fe), aluminum (Al), nickel (Ni) and cobalt (Co), which are very corrosion-resistant, which have Curie temperatures $T_C>800°$ C. and can be used at temperatures up to 450° C. (some types up to 550° C.).

Very strong permanent magnets are made from alloys of neodymium (Ne), iron (Fe) and boron (B). These neodymium magnets, however, have a relatively low Curie temperature $T_C=310°$ C. and can normally only be used at temperatures up to 80° C. Some neodymium materials, however, can be used at temperatures up to 150° C., 180° C. or 200° C. (types SH, UH and EH, respectively) and can thus also be used in methods according to embodiments of the invention at higher temperatures.

The magnetic element can be part of the mold and can be attached to it either from the outside or from the inside. For instance, the magnetic element can be affixed to the mold shell from the outside. Here, it is advantageous to provide an indentation or a pocket in the mold shell, for example, in the form of a blind hole, that at least partially accommodates the magnetic element so that the magnetic element can be positioned as close as possible to the inner surface of the mold wall.

However, the magnetic element can also be arranged with a precise fit in a through-hole or in some other opening provided in the mold shell. As a result, the magnetic element is in direct contact with the starting material during the rotational molding. Depending on the specific requirements, the surface of the magnetic element facing the interior of the mold can project into the interior of the mold, it can lie essentially flush with the inner surface of the mold, or it can be recessed with respect to the inner surface of the mold, as a result of which a structure that projects toward the outside is formed on the plastic molded part.

The magnetic element can also be configured as an insert part or as an integral part that is attached in the rotational melt mold before the shaping process in such a way that, after the shaping, it is at least partially joined integrally to the molded part, that is to say, it is integrally incorporated into the molded part during the shaping process. Thus, the magnetic element can first be affixed in the interior of the mold prior to the shaping process. Subsequently, the container is filled with a starting material (plastic or plastic precursor). During the rotational molding, the magnetic element is embedded into the wall of the plastic molded part so that it subsequently remains in the plastic molded part. The magnetic interaction between the magnetic integral part or insert part and the container wall brings about a tight and firm fit of the integral part or insert part in the container wall. Such insert parts can be can be pipe sections, sleeves, reinforcement elements, flange rings, cap nuts, hexagon nuts or the like which, due to their magnetic properties, hold a portion of the starting material in place during the rotational molding process and are thus embedded into the material of the plastic molded part reliably and with a locally high level of material accumulation.

As an alternative, the insert parts can also be reliably embedded in that the magnetic element is configured as a fixation element or as a holding element with which the insert part is affixed in the rotational mold. Thus, the magnetic element can be configured, for example, as a stud bolt or as part of a stud bolt that holds in the mold a nut that is to be embedded into the plastic molded part. Consequently, in order to achieve a good embedding of the insert part with a high level of material accumulation, it is advantageous for the insert part to have a high susceptibility and to bundle and direct the magnetic field lines. The magnetic element can also be configured as a fixation element that magnetically holds the insert part that is to be embedded.

Such magnetic areas in a plastic molded part can be used for a wide array of application purposes. Aside from the production of plastic molded parts with viewing windows, it is also possible to manufacture molded parts that are multi-colored or that have certain areas that exhibit other special properties.

In order to improve the local accumulation of the starting material by the magnetic element, according to another embodiment, it is provided for the rotation of the rotational melt mold to be interrupted during the shaping or forming at least in one rotational axis, at least temporarily. If the rotation of the rotational mold is stopped at least in one axis in a controlled manner at suitable times during the course of the process, then the starting material can come to a standstill in the area of the magnetic element and can more effectively be held in place by the magnetic element.

According to another advantageous embodiment, the rotation of the rotational melt mold is interrupted in such a way that the magnetic element comes to rest at a lowest point of the rotational melt mold and/or below the level of the starting material. This measure can be carried out at least once or, if applicable, it can be repeated for various areas in which magnetic elements are present, and/or for one and the same area of the mold. The point in time, the frequency and the duration of these interruptions in the rotation as well as the mold position during the standstill can be selected in such a way that the desired result can be achieved.

Particularly during the processing of starting material in the form of a thermoplastic, it is advantageous for the rotational melt mold to first be rotated for a certain period of time at temperatures below the melting or softening temperature of the plastic material. As a result, a high level of accumulation of starting material in the mold in the area of the magnetic element can already be achieved before the actual sintering process begins. When the sintering process then begins resulting from heating to temperatures above the melting or softening temperature of the plastic material, the mold in the area of the magnetic element already has a good level of accumulation of starting material that has not yet been sintered. Areas of the plastic molded part that are supposed to end up with a particularly thick wall can thus be systematically and intentionally influenced. Advantages of such delayed heating arise especially in combination with preferential, or selective, sintering of a magnetic plastic from a mixture that otherwise contains non-magnetic plastics.

The effect of the material separation and the separation accuracy can be further increased by additional measures. For instance, the mold can first be filled only with the magnetic plastic and rotated, preferably biaxially. Once the magnetic element is thoroughly populated with the starting material, the non-magnetic starting material is added and the mold is heated up while being rotated biaxially.

Another variant proposes for the magnetic starting material to be placed systematically either directly onto the magnetic element or onto the area in the interior of the rotational melt mold where the magnetic element is positioned (if applicable, from the outside). Subsequently, the non-magnetic plastic is placed into the mold, which then rotates and is heated. For example, a magnetic plastic powder, which is a portion of the starting material, can be placed into the rotational melt mold, preferably directly onto the magnetic element, before the rest of the starting material is introduced. This approach effectively ensures that a large amount of material will collect on the magnetic element during the shaping process.

Another embodiment of the invention provides that, after the forming process, in a further step d), the rotational melt mold is stopped, filled with additional starting material, and made to rotate once again, so that an inner second plastic layer is formed. This procedure can be repeated many times, whereby different plastic materials with different properties can be used. The starting material with which the rotational melt mold is filled either can have magnetic properties or not. In this manner, plastic containers with multi-layered wall structures and optimal wall thicknesses or special features can be produced.

In a similar manner, plastic molded parts whose walls have a two-layer structure can be produced in which only a second/inner layer of the wall of the molded part contains magnetic material. According to an embodiment of the invention, it is provided that, before the starting material is placed into the rotational melt mold, the rotational melt mold is filled with a plastic or a plastic precursor and then rotated so that the magnetic element and the starting material are separated by at least one plastic layer after the shaping process. For this purpose, in a first step, a first starting material without magnetic properties or magnetic additives is placed into the rotational melt mold and, under rotation, it is shaped into a first/outer layer. Then (either by interrupting the rotation and opening the mold or else by using a thermally insulated container ("dropbox"), that is incorporated on or in the mold and filled with a second starting material), a second starting material in the form of a plastic or a plastic precursor is placed into the rotational melt mold, whereby this second material has at least partially magnetic properties and/or contains magnetic additives. Appropriate modifications also permit the production of three-layer and multi-layer containers, whereby (either by interrupting the rotation and opening the mold several times or else by providing several dropboxes on the mold), one can freely choose where magnetic material is going to be present in the layer sequence.

Another embodiment of the invention provides a plastic molded part that is produced by means of one of the methods described herein.

Moreover, an embodiment of the invention also relates to a rotational melt mold for carrying out one of the methods described herein, whereby the rotational melt mold has at least one mold shell that rotates around at least one rotational axis, whereby a magnetic element is attached to the mold shell. Here, it has proven to be advantageous for the magnetic element to be configured as an insert part or as an integral part made of plastic or of a fiber-reinforced plastic composite, which can be attached to the rotational melt mold before the shaping process in such a way that, after the shaping process, it is at least partially joined integrally to the molded part.

FIG. 1 shows a rotational mold in the form of a rotational melt mold 1 for the production of a molded part made of plastic, especially a container, by means of rotational molding, with inner walls 2 whose contour defines the outer contour of the finished molded part. The rotational melt mold 1 consists of two half-shells that are assembled along their flange-like edges 3 so as to form a hollow vessel. Via an opening (not shown here), the rotational mold is filled with a starting material in the form of a plastic precursor or in the form of a plastic, forming a melt under the effect of heat. Heat is introduced into the rotational melt mold 1 by means of an oven (not shown here) and the rotational melt mold 1 is made to rotate around two axes that are arranged perpendicularly relative to each other. The plastic precursor is polymerized or else the plastic melts and starts to be deposited on the inside of the rotational melt mold, giving the molded part or the plastic container its later shape.

A magnetic element 4 in the form of a permanent magnet is attached in the bottom area of the rotational melt mold 1, on the outside. Here, the starting material placed into the rotational mold is a plastic powder that melts under the effect of heat and forms the later container wall. The starting material is magnetic and is configured in such a way that it can interact magnetically with the magnetic element 4. For this purpose, the plastic powder can be mixed, for example, with magnetite powder so that the plastic particles have magnetic properties and can be attracted by the magnetic element 4 and held in place there.

Figure 2:
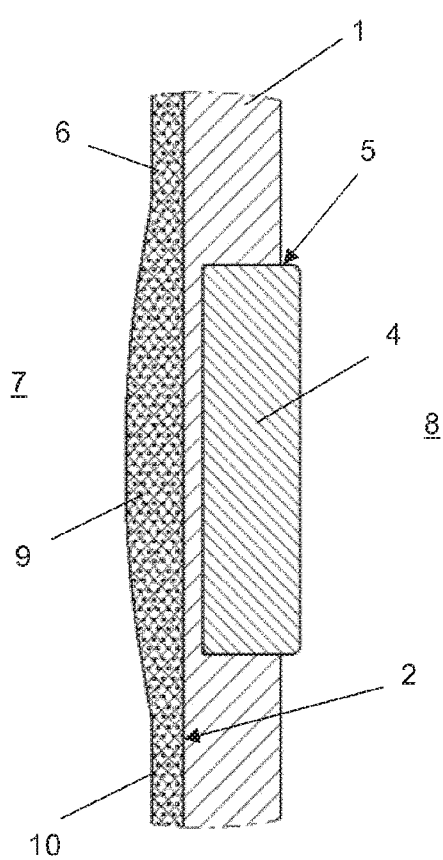
FIG. 2 a sectional view of a section of the rotational melt mold of FIG. 1.

FIG. 2 shows a sectional view of a section of the bottom area of the rotational melt mold 1 of FIG. 1 during the production or shaping process. An indentation 5 is shaped onto the right-hand side on the outside wall of the rotational melt mold 1. The reference numeral 7 designates the interior of the rotational melt mold 1, whereas the reference numeral 8 designates the area outside of the rotational melt mold 1. A magnetic element 4 has been inserted from the outside into the indentation 5. Due to the heat input, the starting material 6 has formed a melt in the rotational melt mold 1. Owing to the rotation of the rotational melt mold 1 around several axes, the melt has been deposited onto the inner wall 2 of the rotational melt mold 1. Owing to the magnetite powder that has been added to the starting material, the starting material 6 is magnetically attracted by the magnetic element 4 through a thin section of the inner wall 2 and held in place there. A local material accumulation 9 occurs in the area of the magnetic element. Thanks to the rotational molding process, the starting material 6 forms the wall 10 of the molded part, whereby the wall thickness is increased in the area of the magnetic element 4.

If special shapes for the increase 9 in the wall thickness are desired, then it is also possible to vary the shape of the magnetic element 4. For example, the magnetic element 4 can be in the form of a ring magnet, as a result of which a ring extending inwards from the inner wall 2 of the container would be formed with a locally increased wall thickness.

Subsequent to the shaping process, the rotational mold is opened and the finished container is removed.

Figure 3:
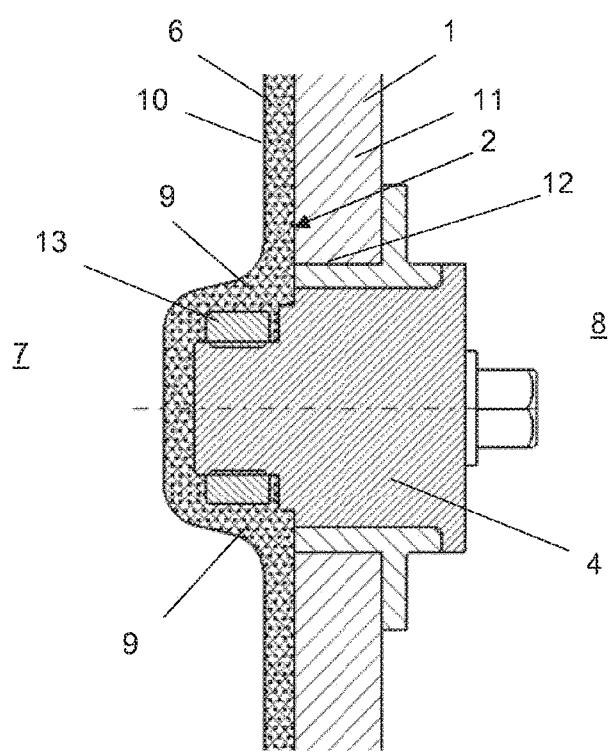
FIG. 3 a sectional view of the production of a plastic molded part according to a second embodiment of the invention.

FIG. 3 shows the wall 11 of a rotational melt mold 1 with a continuous opening 12. In the opening 12, there is a magnetic element 4 to hold an insert part 13 that has been placed onto a front section of the magnetic element 4. In the embodiment shown, the insert part 13 is a hexagon nut. The insert part 13 is magnetic so that it is held in place by the magnetic element 4. The starting material 6 is likewise magnetic and, because of the rotational melt process, it is deposited onto the inner wall 2 of the rotational melt mold 1 and over the front section of the magnetic element 4 located in the interior 7 of the rotational melt mold 1 as well as over the insert part 13, subsequently forming the container wall. In this process, the insert part 13 is embedded into the plastic molded part. This ensures a firm fit of the insert part 13. Through the magnetic interaction with the magnetic element, the starting material 6 forms an increase 9 in the wall thickness in the area of the insert part 13.

Figure 4:
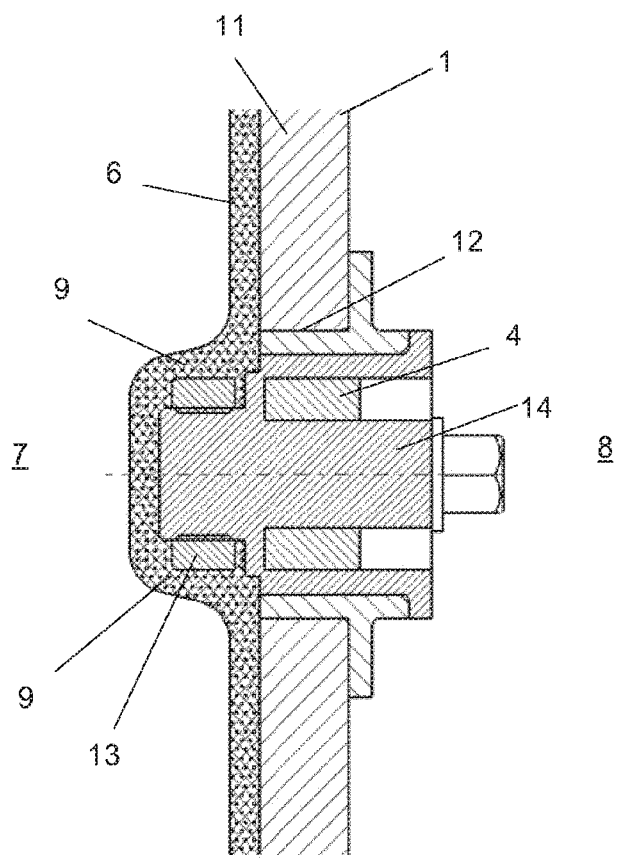
FIG. 4 a sectional view of the production of a plastic molded part according to a third embodiment of the invention.

In the embodiment shown in FIG. 4, the rotational melt mold likewise has an opening 12 in the wall 11. A holding element 14 to hold an insert part 13 is inserted into the opening, whereby the front section of the holding element 14 extends into the interior 7 of the rotational melt mold 1. On the outside of the holding element 14, a circular opening is formed into which a magnetic element 4 in the form of a ring magnet has been inserted. The insert part 13 is made of metal and is held in position by the magnetic element 4. At the same time, the magnetic element 4—either directly and/or indirectly through the metallic insert part 13—interacts with the magnetic starting material 6 of the container and ensures local increases 9 in the wall thickness in the area of the insert part 13.

Figure 5:
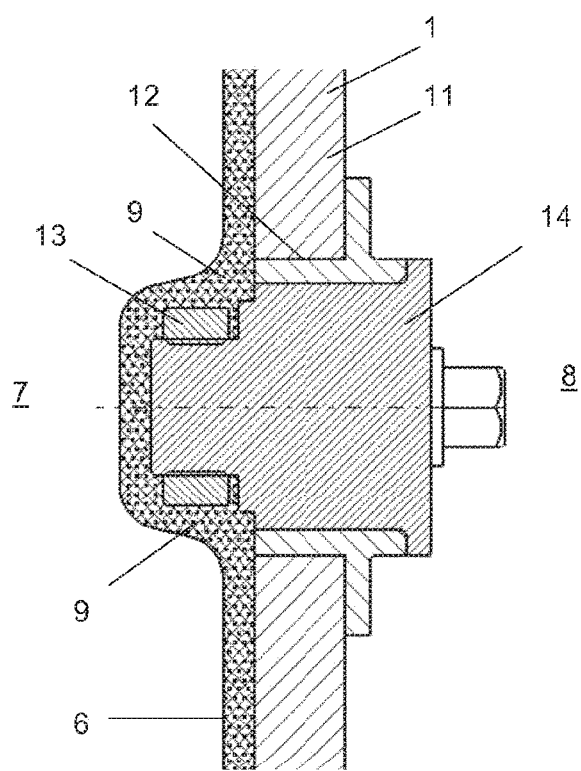
FIG. 5 a sectional view of the production of a plastic molded part according to a fourth embodiment of the invention.

In the embodiment in FIG. 5 as well, the starting material 6 is magnetic and has a magnetic additive. The holding element 14 is not magnetic and is not configured to interact magnetically with the starting material 6 of the plastic molded part. On the front section of the holding element 14 facing the interior 7, the insert part 13 is arranged in the form of a permanent magnet that magnetically attracts and holds a portion of the starting material 6 in place so that a considerable portion of the starting material collects around the insert part 13. As a result, a local increase 9 in the wall thickness is created in the fully shaped molded part, and the insert part 13 is firmly embedded into the wall 10 of the plastic molded part.

The insert part 13 shown in FIG. 5 is made of metal. As an alternative, the insert part 13 can also be an integral part made of plastic or of a plastic that itself is magnetic and that can interact magnetically with the starting material 6.

Figure 6:
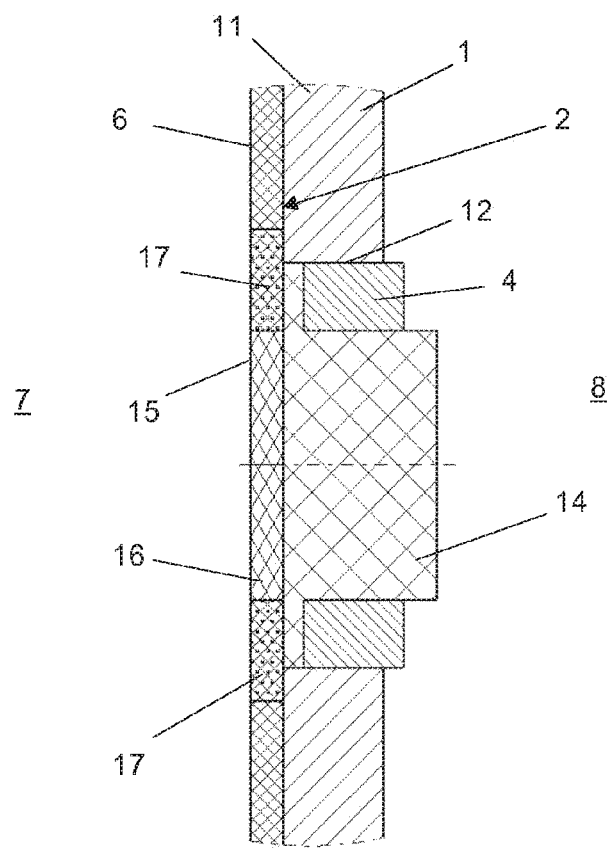
FIG. 6 a sectional view of the production of a plastic molded part with a viewing window according to a fifth embodiment of the invention.

In the embodiment shown in FIG. 6, a holding element 14 is placed into an opening 12 in the wall 11 of the rotational melt mold 1, whereby the magnetic element 4 in the form of a ring magnet is placed onto the outer circumference of a section of the holding element 14 facing the outside 8. The holding element 14 is made of Teflon and has a thermally insulating effect. A prefabricated integral part 15 in the form of a plastic disc is arranged in the interior of the rotational mold.

The integral part 15 has a central transparent area 16 that comprises a viewing window made of white translucent polyethylene. The edge area 17 consists of a black polyethylene with magnetic properties so that the black plastic 17 can interact magnetically with the magnetic element 4. In contrast, the central area 16 is not magnetic. The magnetic element 4 and the edge area 17 of the integral part 15 are separated from each other by a thin-walled section of the holding element 14. Owing to the magnetic interaction with the edge area 17, the magnetic element 4 positions the integral part 15 onto the inner wall 2 of the rotational mold 1 and holds it in place there.

During the rotational molding process, the starting material 6 is deposited onto the inner wall 2 of the mold wall 11. In the example shown, the color of the starting material 6 is black. Thus, a black container with a white or translucent window is formed in the later molded part. The outer diameter of the integral part 15 is larger than the opening 12 in the wall 11 of the rotational mold or larger than the thermally insulating holding element 14. Consequently, an outer edge of the integral part 15 is heated during the rotational molding process due to its contact with the inner wall 2 of the rotational melt mold. This measure facilitates the joining or sintering of the starting material 6 onto the edge 17 of the integral part 15.

Figure 7:
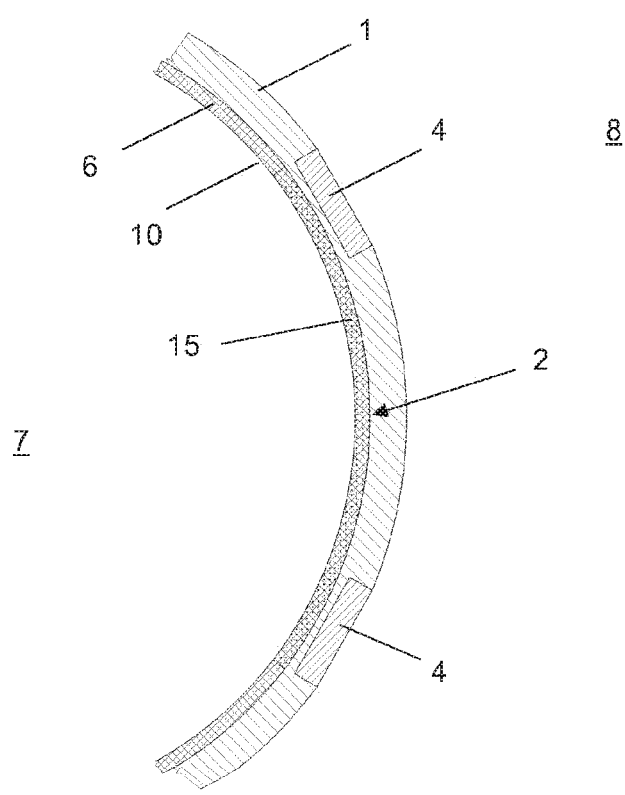
FIG. 7 a sectional view of the production of a curved plastic molded part according to a sixth embodiment of the invention.

FIG. 7 shows a curved section of a rotational mold 1 into whose outer wall two magnetic elements 4 have been placed. On the inner wall 2, there is a curved integral part 15 made of a fiber-reinforced plastic composite. Owing to the rotational molding process, the integral part 15 is incorporated or embedded into the wall 10 of the molded part formed by the starting material 6. For the rotational molding process, the integral part 15 is held in position by the two magnetic elements 4. For purposes of the magnetic interaction with the magnetic elements 4, the integral part 15 made of a fiber-reinforced plastic composite has appropriate additives that have been introduced into the material of the integral part 15 and that impart it with magnetic properties so that the integral part 15 can be attracted and held in place by the magnetic elements 4. The integral part 15 made of a fiber-reinforced plastic composite forms a reinforced part of the outer wall 10 of the finished molded part.

Figure 8:
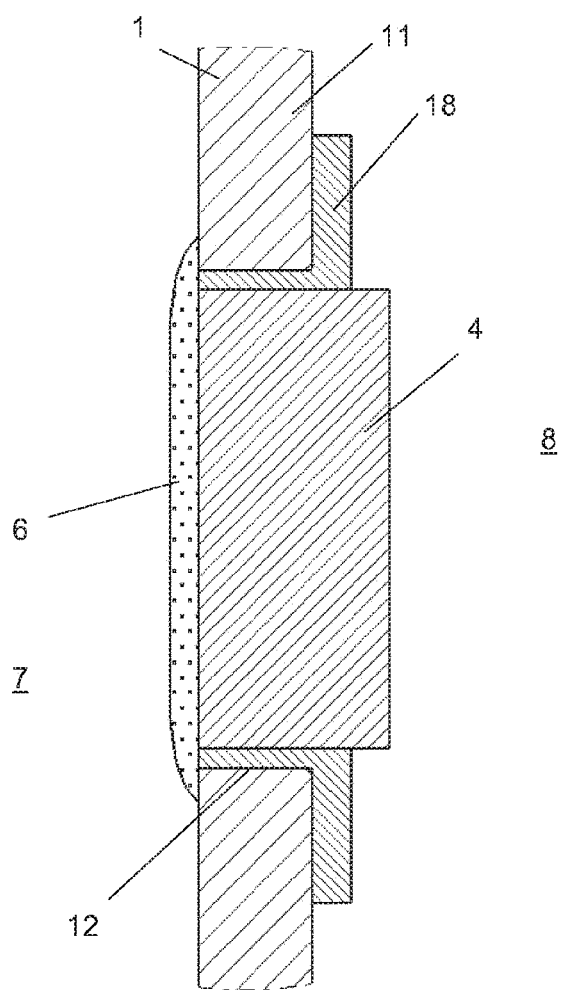
FIG. 8 a sectional view of the production of a plastic molded part according to a seventh embodiment of the invention.

FIG. 8 shows a bushing 18 that is arranged in a through-opening 12 in the wall 11 of the rotational mold 1 and that serves to hold a magnetic element 4. The bushing 18 has a through-opening so that the magnetic element 4 is in direct contact with the interior 7 of the rotational mold 1. There, a magnetic starting material 6 in powder form is applied directly onto the magnetic element 4. Additional starting material 6 or a non-magnetic plastic can now be placed into the rotational melt mold 1 and the rotational melt process can begin. Since the starting material is placed directly onto the magnet, a local increase in the wall thickness or—in the case of the addition of a non-magnetic plastic—a selective shaping of the magnetic material in the area of the magnetic element can be effectively prepared.

Figure 9:
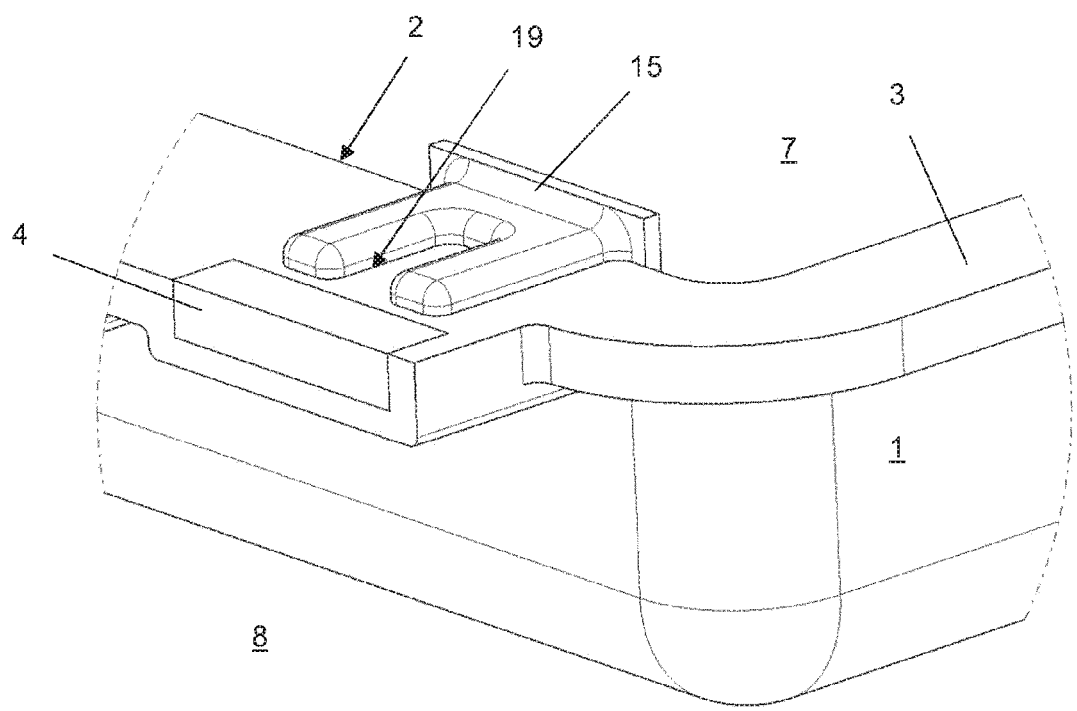
FIG. 9 a perspective view of a rotational melt mold for the production of a plastic molded part with an integral part according to an eighth embodiment of the invention.
Figure 10:
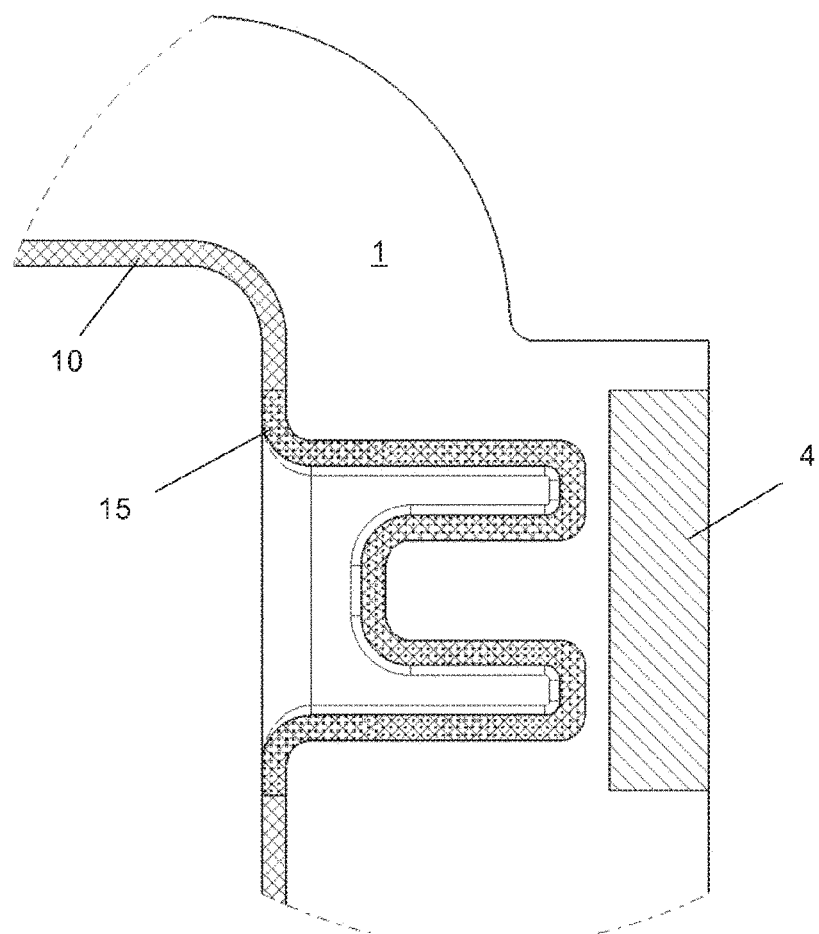
FIG. 10 a sectional view of a section of the rotational melt mold of FIG. 9.

FIG. 9 shows a perspective view of a section of a rotational melt mold 1. On the inner wall 2, in the edge 3 of the rotational mold 1, there is an indentation that extends into the edge 3 and that forms a receptacle 19 for an integral part 15 made of plastic. The integral part 15 serves to produce a functional or contour feature in the form of a lug in the outer wall of the molded part. On the outside 8 of the rotational melt mold 1, a magnetic element 4 is positioned in front of the integral part 15. The plastic of the integral part 15 is magnetic and interacts magnetically with the magnetic element 4 so that the integral part 15 is held in place in the rotational melt mold 1 by means of the magnetic element. During the rotational melt process, the molten plastic is deposited onto the inner wall 2 of the rotational mold 1. As FIG. 10 shows, the integral part 15 is incorporated or embedded into the wall 10 of the molded part, whereby the integral part 15 is joined directly to the wall 10.

Below, eight embodiments of the production of the molded part will be explained by way of examples.

Example 1

Plastic Precursor With Magnetic Additives, Increase in the Wall Thickness

According to an embodiment for the production of a fuel tank, pre-mixes of ε-caprolactam with 0.6% by weight of sodium caprolactamate as the catalyst and ε-caprolactam with 0.9% by weight of hexamethylene-1,6-bis-carbamido-caprolactam as the activator are melted in two separate vessels and kept at a temperature of 100° C. A quantity of 2% by weight of magnetite powder ($Fe_3O_4$; particle diameter of 2-3 μm), which was previously dried for 3 hours at 120° C. under a vacuum, is added to the second pre-mix, and the mixture is continuously stirred in order to prevent the particles from settling. The vessels with the two pre-mixes are connected via lines to a mixing head from which another line branches off that is fitted with an injection device at its end. The mixing head, the lines between the vessels containing the pre-mixes and the mixing head as well as the line from the mixing head to the injection device can all be heated and are kept at a temperature of 100° C.

A rotational mold, which can have the shape of the fuel tank of a motorcycle, is fitted with a magnetic element in the form of a neodymium magnet (type EH, diameter of 30 mm, length of 10 mm; axially magnetized) in the area of the left-hand side wall of the later motorcycle tank, and said magnet is affixed from the outside in a 7 mm-deep blind hole of the 8 mm-thick aluminum mold shell. The rotational mold is equipped with a venting device that keeps the pressure in the mold at atmospheric pressure. The rotational mold is preheated in an oven at 160° C. The two pre-mixes are combined in equal parts by weight in the mixing head and are thoroughly mixed so as to form a reaction mixture that thus contains a total of 1% by weight of magnetite powder. A first portion (2200 g) of the reaction mixture is added into the rotational mold within 20 seconds. The rotational mold is slowly rotated biaxially in an oven that is kept at a temperature of 205° C., so that the reaction mixture comes into contact with every part of the inner surface of the mold and is deposited onto the inner surface. After 200 seconds, the rotation is interrupted so that a second portion (2200 g) of the reaction mixture can be added. Subsequently, while being further heated, the mold is slowly rotated biaxially for 180 seconds before it is cooled off to 70° C. [158° F.] in a cooling chamber while still being rotated. The rotational mold is opened, and the molded part in the form of a motorcycle tank is removed.

The motorcycle tank is cut open and the wall thickness is measured. In the area of the side wall that is fitted with the magnetic element, a significantly increased wall thickness between 4.0 mm and 5.7 mm is ascertained. At a distance of 4 cm from this area, a wall thickness between 2.8 mm and 4.3 mm is measured. In the corresponding area (which was not fitted with a magnetic element) on the right-hand side of the essentially mirror-symmetrical motorcycle tank, a wall thickness between 2.6 mm and 4.4 mm is measured.

Example 2

Plastic With Magnetic Additives, Increase in the Wall Thickness

According to an embodiment for the production of a plastic molded part in the form of a cuboidal test container (dimensions approximately 20×30×50 $cm^3$), an appropriate rotational mold is filled with 2.6 kg of a black polyethylene in powder form (ICORENE 1613 BK 85) into which 5% by weight of magnetite powder ($Fe_3O_4$; particle diameter of 2-3 μm) had previously been compounded. The quantity of polyethylene relative to the surface of the later plastic molded part is selected so as to yield a theoretical mean wall thickness of about 4.5 mm.

One surface of the mold is fitted with a disc magnet (diameter of approximately 100 mm, length of approximately 30 mm; axially magnetized) that is affixed from the outside in a 7 mm-deep blind hole of the 8 mm-thick aluminum mold shell.

The rotational mold is slowly rotated biaxially for 25 minutes in an oven that has been heated to 220° C. and then—still under biaxial rotation—moved out of the oven into a cooling chamber, where it is cooled off by means of air cooling over the course of 15 minutes. The plastic molded part is removed and cut open. The increase in the wall thickness in the area of the magnetic element can already be clearly seen with the naked eye. A wall thickness between 5.9 mm and 6.5 mm is measured in this area. At other places of the cuboidal test container, wall thicknesses between 4.1 mm and 4.9 mm are ascertained.

Example 3

Plastic Mixture With and Without Magnetic Additives

The rotational mold of Example 2 is filled with 2.4 kg of a white polyethylene (PE) in powder form (ICORENE 1613)

without magnetic additives. In addition, 100 g of the black PE powder of Example 2 (but with 10% by weight of magnetite powder) is placed into the mold.

The rotational mold is first slowly rotated biaxially for 10 minutes without being heated. Subsequently, the rotation is continued for 25 minutes in an oven that is heated to 220° C. The mold—while still being biaxially rotated—is moved out of the oven into a cooling chamber, where it is cooled off by means of air cooling over the course of 15 minutes. The plastic molded part is then removed. The essentially white part has a slight gray-black marbled patterning. An essentially black area with a diameter of approximately 100 mm is shaped on in the area of the magnetic element.

Example 4

Plastic Mixture; Direct Placement of the Magnetic Component onto the Magnetic Element In the rotational mold of Example 2, 100 g of the black PE material of Example 2 (with 5% by weight of magnetite powder) is placed onto the mold shell in the area of the magnetic element. Any powder that does not adhere to the magnet is removed by turning and rotating the open mold shell. Then 2.4 kg of the white PE material of Example 3 are placed into the mold, which is subsequently closed and slowly rotated biaxially for 25 minutes in an oven that has been heated to 220° C. The mold—still under biaxial rotation—is moved out of the oven into a cooling chamber, where it is cooled off by means of air cooling over the course of 15 minutes. The plastic molded part is then removed. The outside of the essentially white part has only a few black inclusions. A black area with a diameter of approximately 100 mm is shaped on in the area of the magnetic element.

Example 5

Integral Part Made of Plastic With Magnetic Additives, Viewing Window

In the rotational mold of Example 2, a plastic disc with a diameter of 110 mm is magnetically affixed in the area of the magnetic element. The disc has a thickness of 5 mm and consists of a central area (diameter of 70 mm) of white polyethylene and an encircling edge (width of 20 mm) of black polyethylene containing 8% by weight of magnetite powder. The central area and the edge area are integrally bonded to each other.

The rotational mold is filled with 2.6 kg of a black polyethylene in powder form (ICORENE 1613 BK 85) that does not contain any magnetic additives.

The mold is slowly rotated biaxially for 25 minutes in an oven that has been heated to 220° C. and then—still under biaxial rotation—moved out of the oven into a cooling chamber, where it is cooled off by means of air cooling over the course of 15 minutes. A black plastic molded part is removed that, on one surface, has a translucent window of white material with a diameter of 70 mm. The employed plastic disc is integrally bonded along its circumference to the rest of the wall of the container so as to be liquid-tight.

Example 6

Integral Part Made of Plastic With Magnetic Additives, Lug

A rotational mold, which has the shape of a urea tank of a utility vehicle, is fitted with a magnetic element in the area of a double-walled fastening lug of the later urea tank. An integral part that is in the form of a lug of the later urea tank and that is adapted to the mold contour is placed into the lug area of the mold. The integral part consists of a black polyethylene containing 5% by weight of magnetite powder (particle size of 2-3 µm), and it is magnetically affixed in the rotational mold.

The rotational mold is filled with a black polyethylene in powder form (ICORENE 1613 BK 85) that does not contain any magnetic additives. It is slowly rotated biaxially for 25 minutes in an oven that has been heated to 220° C. and then—still under biaxial rotation—moved out of the oven into a cooling chamber, where it is cooled off by means of air cooling over the course of 15 minutes. The plastic molded part in the form of a urea tank is then removed. It has a fastening lug that is integrally bonded to the rest of the wall of the container so as to be liquid-tight.

Example 7

Magnetic Element in the Form of a Holding or Fixation Element or as Part of a Holding or Fixation Element to Hold an Insert Part According to an embodiment for the production of a plastic molded part in the form of a fuel tank of a construction machine, an appropriate rotational mold is fitted with a fixation element in the form of a stud bolt. The stud bolt is made of magnetic steel and it has a main outer diameter of 36 mm with which it can be fitted into a corresponding hole in the aluminum mold shell. A large blind hole of the stud bolt accommodates a magnetic element in the form of two stacked disc magnets (diameter of 30 mm; length of 15 mm each; axially magnetized), and this magnetic element extends to just below the threaded area of the stud bolt that, when it has been installed, faces the interior of the mold. The threaded area has an insert part in the form of a ferromagnetic hexagon nut that forms a connection port in the later fuel tank.

The rotational melt mold is filled with 6.3 kg of a black polyethylene in powder form (ICORENE 1613 BK 85) into which 2% by weight of magnetite powder ($Fe_3O_4$; particle diameter of 2-3 µm) had previously been compounded.

The rotational mold is slowly rotated biaxially for 30 minutes in an oven that has been heated to 220° C. and then—still under biaxial rotation—moved out of the oven into a cooling chamber, where it is cooled off by means of air cooling over the course of 15 minutes. The plastic molded part is removed and cut open. The plastic layer on the inside of the container on the insert part is markedly thicker than in a corresponding tank from the same mold that had previously been produced with a conventional stud bolt without a magnetic element.

Example 8

Magnetic Element in the Form of an Insert Part

According to an embodiment for the production of a plastic molded part in the form of a fuel tank of a construction machine, an appropriate rotational mold is fitted with a stud bolt made of aluminum. The stud bolt is fitted into a hole in the aluminum mold shell and its end facing the interior of the mold has a magnetic element in the form of a previously magnetized, that is to say, a permanently magnetic hexagon nut that, as an insert part, forms a connection port in the later fuel tank.

The rotational melt mold is filled with 6.3 kg of a black polyethylene in powder form (ICORENE 1613 BK 85) into which 2% by weight of magnetite powder ($Fe_3O_4$; particle diameter of 2-3 µm) had previously been compounded.

The rotational mold is slowly rotated biaxially for 30 minutes in an oven that has been heated to 220° C. and then—still under biaxial rotation—moved out of the oven into a cooling chamber, where it is cooled off by means of air cooling over the course of 15 minutes. The plastic molded part is removed and cut open. The plastic layer on the inside of the container on the permanently magnetic insert part is markedly thicker than in a corresponding tank from the same mold that had previously been produced with an insert part that was not permanently magnetic.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 rotational melt mold (rotational mold)
2 inner wall of the rotational mold
3 edge
4 magnetic element
5 indentation
6 starting material
7 interior of the rotational mold
8 exterior of the rotational mold
9 increase in the wall thickness
10 wall of the plastic molded part
11 wall of the rotational mold
12 opening
13 insert part
14 holding element
15 integral part
16 central area
17 edge area
18 bushing
19 receptacle

The invention claimed is:

1. A method for production of a molded part made of plastic by rotational molding, the method comprising:
    placing a starting material in a form of at least one of a plastic or a plastic precursor into a rotational melt mold that is fitted with at least one magnetic element; and
    rotating the rotational melt mold so as to shape the starting material, wherein during the rotating the at least one magnetic element rotates together with the rotational melt mold while the starting material is being shaped, the starting material and the at least one magnetic element being configured in such a way that the starting material and the at least one magnetic element interact magnetically such that a portion of the starting material is attracted and held in place by the at least one magnetic element while the starting material is being shaped, thereby causing a local increase in thickness of a corresponding wall portion of the molded part.

2. The method according to claim 1, wherein the starting material has a magnetic additive.

3. The method according to claim 1, wherein the starting material contains a component that is configured to interact magnetically with the at least one magnetic element.

4. The method according to claim 3, wherein the component of the starting material is chemically incorporated into the starting material.

5. The method according to claim 1, wherein the at least one magnetic element includes a permanent magnet.

6. The method according to claim 1, wherein the starting material is part of a mixture that contains at least one non-magnetic part.

7. The method according to claim 1, further comprising at least temporarily interrupting the rotation of the rotational melt mold about at least one rotational axis while the starting material is being shaped.

8. The method according to claim 7, wherein the interrupting is conducted in such a way that the at least one magnetic element comes to rest at a lowest point of the rotational melt mold and/or below a level of the starting material.

9. The method according to claim 1, further comprising, after the shaping of the starting material, filling the rotational melt mold with at least another plastic and/or a plastic precursor and then rotating the rotational melt mold further.

10. The method according to claim 1, further comprising, before the placing of the starting material into the rotational melt mold, filling the rotational melt mold with at least one plastic and/or plastic precursor and rotating the rotational melt mold.

11. The method according to claim 1, wherein the at least one magnetic element is configured as an insert part or an integral part made of plastic, the insert part or integral part being fitted in the rotational melt mold before the shaping of the starting material in such a way that, after the shaping of the starting material, the at least one magnetic element is at least partially joined integrally to the molded part.

12. The method according to claim 1, wherein the molded part is a container.

13. A method for production of a molded part made of plastic by rotational molding, the method comprising:
    placing an integral part made at least partially of plastic into a rotational melt mold that is fitted with at least one magnetic element;
    placing a starting material in a form of at least one of a plastic or a plastic precursor into the rotational melt mold; and
    rotating the rotational melt mold so as to shape the starting material, wherein during the rotating the molded part is shaped and the integral part is incorporated integrally into the molded part, the integral part and the at least one magnetic element being configured in such a way that the integral part and the at least one magnetic element interact magnetically such that the integral part is attracted and held in place by the at least one magnetic element during the shaping, whereby a portion of the integral part is exposed towards an inside of the molded part and whereby the inside of the molded part is not in contact with the rotational melt mold during the shaping.

14. The method according to claim 13, wherein the integral part is made of a fiber-reinforced plastic composite or of a precursor of a fiber-reinforced plastic composite.

15. The method according to claim 14, wherein the plastic of the fiber-reinforced plastic composite is selected from a thermoplastic or a thermoset plastic.

16. The method according to claim 13, wherein the molded part is a container.

17. The method according to claim 13, wherein the portion of the integral part that is exposed towards the inside of the molded part amounts to over 50% of a surface of the integral part facing the inside of the molded part.

18. The method according to claim 13, wherein the plastic of the integral part has magnetic properties, or wherein the integral part contains magnetic additives.

19. The method according to claim 13, wherein:

the at least one magnetic element positions an edge area of the integral part about a wall opening of the rotational melt mold during the rotating, and wherein the wall opening is defined as an opening within which a holding part is arranged for holding the at least one magnetic element, or is defined as a receptacle defined in an inner wall edge of the mold and within which a portion of the integral part is arranged during the rotating.

20. The method according to claim 13, wherein the rotational melt mold is fitted with the at least one magnetic element on an outside of the rotational melt mold spaced from the integral part.

* * * * *